(12) United States Patent
Im et al.

(10) Patent No.: US 10,446,106 B2
(45) Date of Patent: Oct. 15, 2019

(54) DISPLAY APPARATUS AND METHOD OF DRIVING THE SAME

(71) Applicant: Samsung Display Co., Ltd., Yongin-Si, Gyeonggi-Do (KR)

(72) Inventors: Taegon Im, Gwangmyeong-si (KR); Boyeon Kim, Seoul (KR); Jae-Han Lee, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 15/824,434

(22) Filed: Nov. 28, 2017

(65) Prior Publication Data
US 2018/0293953 A1    Oct. 11, 2018

(30) Foreign Application Priority Data

Apr. 6, 2017 (KR) .......................... 10-2017-0044940

(51) Int. Cl.
*G09G 3/36* (2006.01)
*G09G 3/20* (2006.01)
*H04B 1/16* (2006.01)

(52) U.S. Cl.
CPC ......... *G09G 3/3688* (2013.01); *G09G 3/2018* (2013.01); *G09G 3/3677* (2013.01); *G09G 3/3696* (2013.01); *G09G 2300/0413* (2013.01); *G09G 2310/0251* (2013.01); *G09G 2310/08* (2013.01); *H04B 1/16* (2013.01)

(58) Field of Classification Search
CPC combination set(s) only.
See application file for complete search history.

(56) References Cited

U.S. PATENT DOCUMENTS

| 6,169,435 B1* | 1/2001 | Fujii | G06F 1/10 327/147 |
| 2010/0225620 A1* | 9/2010 | Lee | G09G 3/20 345/204 |
| 2012/0169578 A1* | 7/2012 | Kim | G09G 3/3688 345/93 |
| 2014/0240372 A1* | 8/2014 | Pak | G09G 3/3233 345/690 |

FOREIGN PATENT DOCUMENTS

| KR | 1020050062119 A | 6/2005 |
| KR | 1020160028092 A | 3/2016 |

\* cited by examiner

*Primary Examiner* — Van N Chow
(74) *Attorney, Agent, or Firm* — Cantor Colburn LLP

(57) ABSTRACT

A display apparatus includes a display panel, a gate driving part, a data driving part and a voltage providing part. The display panel displays an image, and includes gate lines and data lines. The gate driving part outputs gate signals to the gate lines. The data driving part outputs data signals to the data lines through data channels, and outputs a dummy data signal through a dummy data channel adjacent to a side of the display panel. The voltage providing part provides a driving voltage to the data driving part, receives the dummy data signal, and controls the driving voltage provided to the data driving part based on a voltage difference of the dummy data signal according to a time of the dummy data signal.

20 Claims, 11 Drawing Sheets

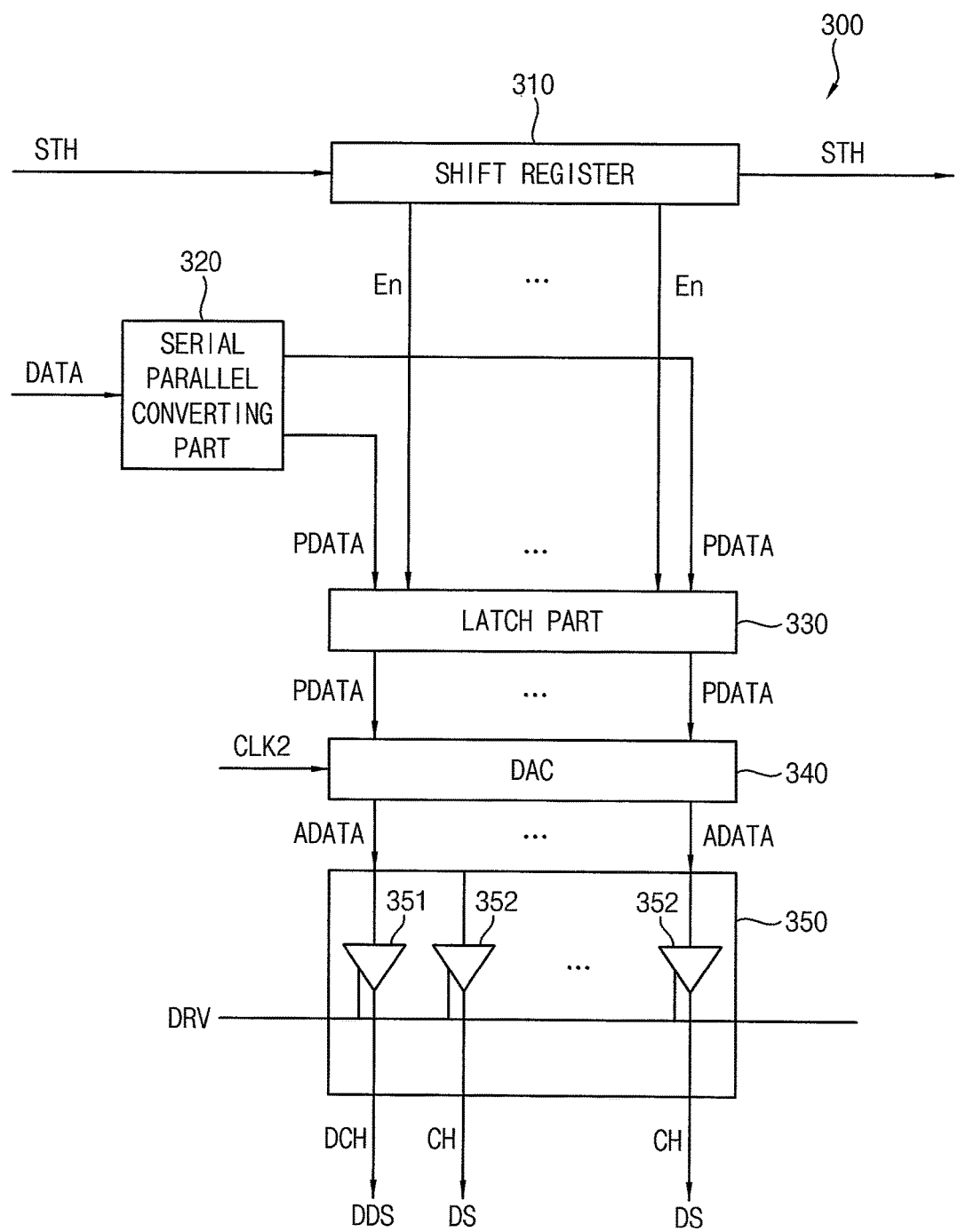

DISPLAY APPARATUS AND METHOD OF DRIVING THE SAME

This application claims priority to Korean Patent Application No. 10-2017-0044940, filed on Apr. 6, 2017, and all the benefits accruing therefrom under 35 U.S.C. § 119, the content of which in its entirety is herein incorporated by reference.

BACKGROUND

1. Field

Exemplary embodiments of the invention relate to an image display, and more particularly to a display apparatus and a method of driving the display apparatus.

2. Description of the Related Art

A display apparatus generally includes a display panel and a display panel driving apparatus.

The display panel includes a gate line, a data line, and a pixel defined by the gate line and the data line. When the display panel is a liquid crystal display panel, the pixel includes a thin film transistor ("TFT"), a liquid crystal capacitor and a storage capacitor. The TFT is electrically connected to the gate line and the data line. The liquid crystal capacitor and the storage capacitor are electrically connected to the TFT.

The display panel driving apparatus includes a gate driving part and a data driving part. The gate driving part outputs a gate signal to the gate line, and the data driving part outputs a data signal to the data line.

When the gate signal increases from a gate off voltage to a gate on voltage, the data signal is charged to the pixel as a pixel voltage.

SUMMARY

Recently, according to an increase of a resolution of a display apparatus, a horizontal time when a gate line is driven decreases, and thus a charge rate of a pixel voltage which is generated by a charge of a data signal to the pixel decreases. Thus, display quality of an image displayed on the display panel decreases.

Exemplary embodiments of the invention provide a display apparatus capable of improving display quality.

Exemplary embodiments of the invention also provide a method of driving the above-mentioned display apparatus.

According to an exemplary embodiment of the invention, a display apparatus includes a display panel, a gate driving part, a data driving part and a voltage providing part. The display panel displays an image, and includes gate lines and data lines. The gate driving part outputs gate signals to the gate lines. The data driving part outputs data signals to the data lines through data channels, and outputs a dummy data signal through a dummy data channel adjacent to a side of the display panel. The voltage providing part provides a driving voltage to the data driving part, receives the dummy data signal, and controls the driving voltage provided to the data driving part based on a voltage difference of the dummy data signal according to a time of the dummy data signal.

In an exemplary embodiment, the voltage providing part may control the driving voltage based on a number of the data lines which are driven by activations of the data signals.

In an exemplary embodiment, the voltage providing part may control the driving voltage based on a grayscale value change of the data signals.

In an exemplary embodiment, the driving voltage may be increased when a multiplication of the grayscale value change of the data signals and the number of the data lines which are driven by the activations of the data signals is not less than a reference value.

In an exemplary embodiment, the driving voltage may be maintained when the multiplication of the grayscale value change of the data signals and the number of the data lines which are driven by the activations of the data signals is less than the reference value.

In an exemplary embodiment, the voltage providing part may control the driving voltage based on the voltage difference of the dummy data signal before and after of a falling time of a first clock signal which is applied to the gate driving part to output the gate signal to the gate line.

In an exemplary embodiment, the voltage providing part may include a first sampling holding part and a second sampling holding part. The first sampling holding part may detect a level of the data signal before the falling time of the first clock signal, and output a first data voltage. The second sampling holding part may detect a level of the data signal after the falling time of the first clock signal, and output a second data voltage.

In an exemplary embodiment, the voltage providing part may further include a first comparing part which compares the first data voltage of the data signal with the second data voltage of the data signal, and outputs a first comparison signal indicating the voltage difference of the dummy data signal.

In an exemplary embodiment, the voltage providing part may further include a variable resistor of which a resistance increases when the first data voltage and the second data voltage are different from each other.

In an exemplary embodiment, when the first data voltage and the second data voltage are the same as each other, the resistance of the variable resistor may be maintained.

In an exemplary embodiment, the variable resistor may be a digital variable resistor.

In an exemplary embodiment, the voltage providing part may further include a first resistor connected to a terminal to which the driving voltage is applied, a second resistor connected between the first resistor and a terminal to which a ground voltage is applied, a third resistor connected to the variable resistor and a terminal to which a reference voltage is applied, and a second comparing part which compares a first voltage which is generated from a division of the driving voltage by the first resistor and the second resistor with a second voltage which is generated from a division of the reference voltage by the third resistor and the variable resistor, and outputs a second comparison signal.

In an exemplary embodiment, the second voltage may increase and a level of the second comparison signal may increase according to an increase of the resistance of the variable resistor.

In an exemplary embodiment, the voltage providing part may further include a third comparing part which compares the second comparison signal with a triangular wave, and outputs a third comparison signal.

In an exemplary embodiment, the voltage providing part may include an inductor connected to a terminal to which an input voltage for forming the driving voltage is input, and a switching element connected to the inductor and the terminal to which the ground voltage is applied.

In an exemplary embodiment, the voltage providing part may control the driving voltage based on the voltage difference of the dummy data signal in a period when the dummy data signal increases.

In an exemplary embodiment, the voltage providing part may detect the voltage difference of the dummy data signal in response to a third clock signal ahead of a second clock signal by N (N is a natural number) horizontal time, which is applied to the data driving part in order to output the data signal to the data line.

According to an exemplary embodiment of the invention, a method of driving a display apparatus includes increasing a data driving voltage applied to a data driving part which outputs data signals to data lines, based on a voltage difference of a dummy data signal according to a time of the dummy data signal output through a dummy data channel adjacent to a side of a display panel displaying an image and comprising a gate line and the data lines, outputting a gate signal to the gate line, and outputting the data signals to the data lines using the increased driving voltage.

In an exemplary embodiment, the method may further include determining wherein a multiplication of a grayscale value change of the data signals and a number of the data lines which are driven by activations of the data signals is not less than a reference value.

In an exemplary embodiment, the increasing the data driving voltage based on the voltage difference of the dummy data signal may include detecting the voltage difference of the dummy data signal before and after of a falling time of a first clock signal which is applied to the gate driving part to output the gate signal to the gate line.

According to the invention, since a driving voltage is increased by detecting a decrease of a dummy data signal according to a decrease of the driving voltage DRV, a decrease of a data signal may be prevented. Therefore, a charge rate of a pixel voltage which is generated by a charge of the data signal to a pixel may increase. Thus, display quality of a display apparatus may be improved.

BRIEF DESCRIPTION OF THE DRAWINGS

The above and other features and advantages of the invention will become more apparent by describing in detailed exemplary embodiments thereof with reference to the accompanying drawings, in which:

FIG. 3 is a block diagram illustrating a first data driving integrated circuit of FIG. 1;

DETAILED DESCRIPTION

Figure 1:
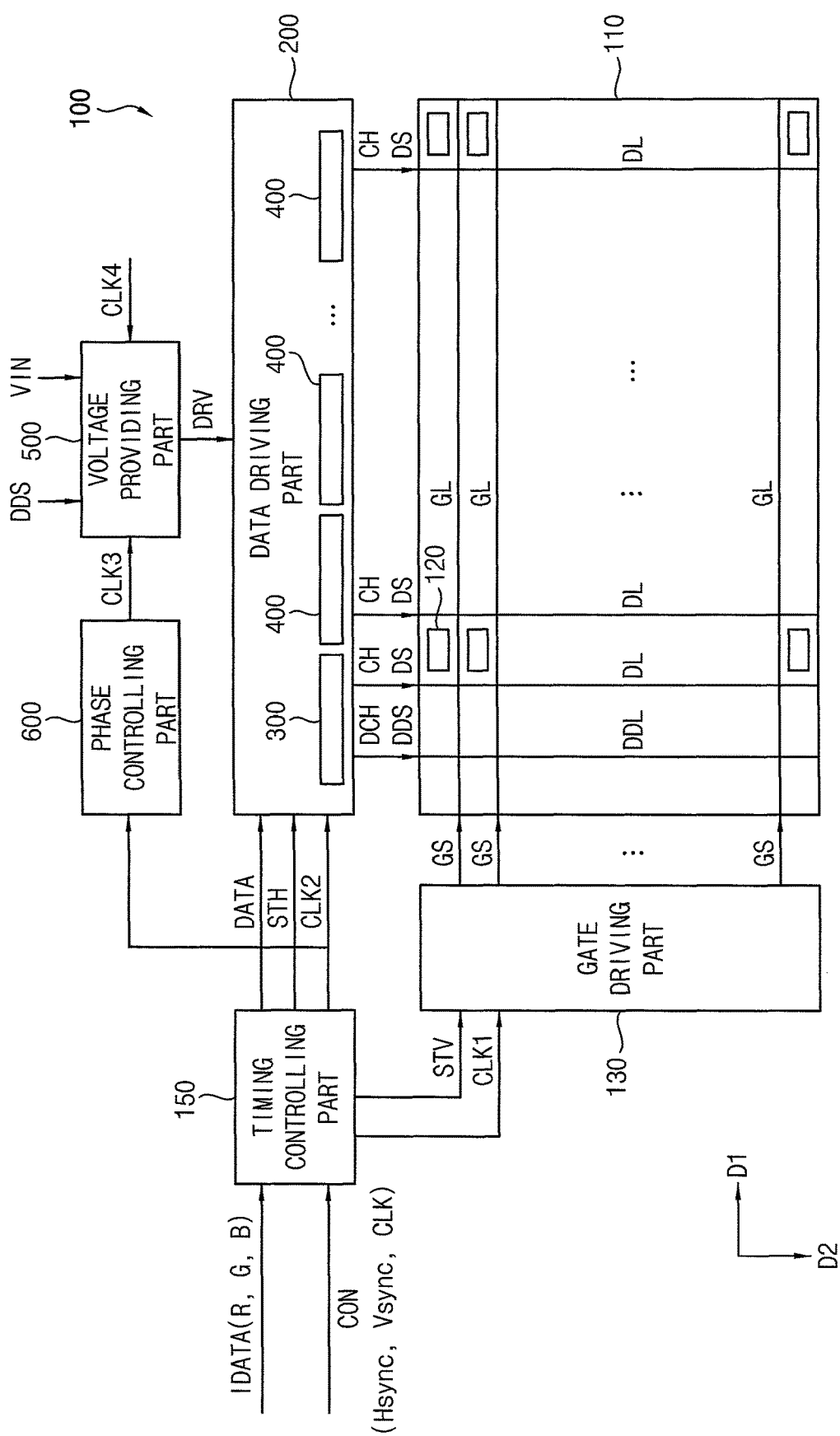
FIG. 1 is a block diagram illustrating an exemplary embodiment of a display apparatus according to the invention.

Hereinafter, the invention will be explained in detail with reference to the accompanying drawings. The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a display apparatus according to an exemplary embodiment of the invention.

Referring to FIG. 1, the display apparatus 100 according to the illustrated exemplary embodiment includes a display panel 110, a gate driving part 130, a data driving part 200, a timing controlling part 150, a voltage providing part 500 and a phase controlling part 600.

The display panel 110 receives a data signal DS from the data driving part 200 to display an image. The display panel 110 includes gate lines GL, data lines DL and pixels 120. The gate lines GL extend in a first direction D1 and are arranged in a second direction D2 substantially perpendicular to the first direction D1. The data lines DL extend in the second direction D2 and are arranged in the first direction D1. Here, the first direction D1 may be parallel to a long side of the display panel 110, and the second direction D2 may be parallel to a short side of the display panel 110. However, the invention is not limited thereto, and the first direction D1 may be parallel to a short side of the display panel 110, and the second direction D2 may be parallel to a long side of the display panel 110. In an exemplary embodiment, the display panel 110 may be a liquid crystal display panel including a liquid crystal, for example.

In addition, the display panel 110 further includes a dummy data line DDL. The dummy data line DDL may be adjacent to a side of the display panel 110. Therefore, the dummy data line DDL may be disposed between the gate driving part 130 and the data lines DL. The dummy data line DDL may not be the pixel 120. In an exemplary embodiment, the pixel 120 may not be disposed between the dummy data line DDL and the data line DL, for example. In addition, the dummy data line DDL may be disposed in a bezel area where the image is not displayed.

The gate driving part 130, the data driving part 200 and the timing controlling part 150 may be defined as a display panel driving apparatus for driving the display panel 110.

The gate driving part 130 generates gate signals GS in response to a vertical start signal STV and a first clock signal CLK1 provided from the timing controlling part 150, and outputs the gate signals GS to the gate lines GL, respectively. The gate driving part 130 may include a gate driver or a gate driving circuit.

The data driving part 200 receives image data DATA from the timing controlling part 150, generates the data signal DS using the image data DATA, and outputs the data signal DS to the data line DL in response to a horizontal start signal STH and a second clock signal CLK2 provided from the timing controlling part 150. The data driving part 200 outputs the data signals DS to the data lines DL through data channels CH. The data driving part 200 may include a first data driving integrated circuit ("IC") 300 and a second data driving IC 400 which generate the data signals DS and output the data signals DS to the data lines DL. In addition, the data driving part 200 may output the data signal DS to the data line DL using a driving voltage DRV provided from the voltage providing part 500.

In addition, the data driving part 200 further outputs a dummy data signal DDS to the dummy data line DDL through a dummy data channel DCH. The dummy data signal DDS may be a signal unrelated to the image displayed on the display panel 110.

The timing controlling part 150 receives input image data IDATA and a control signal CON from an outside. The input image data IDATA may include red data R, green data G and blue data B. However, the invention is not limited thereto, and the input image data IDATA may include various other color data. The control signal CON may include a horizontal synchronous signal Hsync, a vertical synchronous signal Vsync and a clock signal CLK. The timing controlling part 150 processes the input image data IDATA and outputs the image data DATA to the data driving part 200. The timing controlling part 150 generates the horizontal start signal STH using the horizontal synchronous signal Hsync and outputs the horizontal start signal STH to the data driving part 200. In addition, the timing controlling part 150 generates the vertical start signal STV using the vertical synchronous signal Vsync and outputs the vertical start signal STV to the gate driving part 130. In addition, the timing controlling part 150 generates the first clock signal CLK1 and the second clock signal CLK2 using the clock signal CLK, outputs the first clock signal CLK1 to the gate driving part 130, and outputs the second clock signal CLK2 to the data driving part 200. The timing controlling part 150 may include a timing controller or a timing controlling circuit.

The phase controlling part 600 receives the second clock signal CLK2, shifts the second clock signal CLK2 by N (N is a natural number) horizontal time ahead, and generates a third clock signal CLK3. Therefore, the third clock signal CLK3 is ahead of the second clock signal CLK2. The phase controlling part 600 outputs the third clock signal CLK3 to the voltage providing part 500.

The voltage providing part 500 receives an input voltage VIN and a fourth clock signal CLK4 from an outside, receives the dummy data signal DDS from the first data driving integrated circuit 300 of the data driving part 200, and receives the third clock signal CLK3 from the phase controlling part 600. The voltage providing part 500 generates the driving voltage DRV using the input voltage VIN, and provides the driving voltage DRV to the data driving part 200. The voltage providing part 500 detects a voltage difference of the dummy data signal DDS according to a time, and controls the driving voltage DRV based on the voltage difference of the dummy data signal DDS. Specifically, the voltage providing part 500 maintains or increases the driving voltage DRV based on the voltage difference of the dummy data signal DDS. The voltage providing part 500 may detect the voltage difference of the dummy data signal DDS in response to a clock of the fourth clock signal CLK4.

Figure 2:
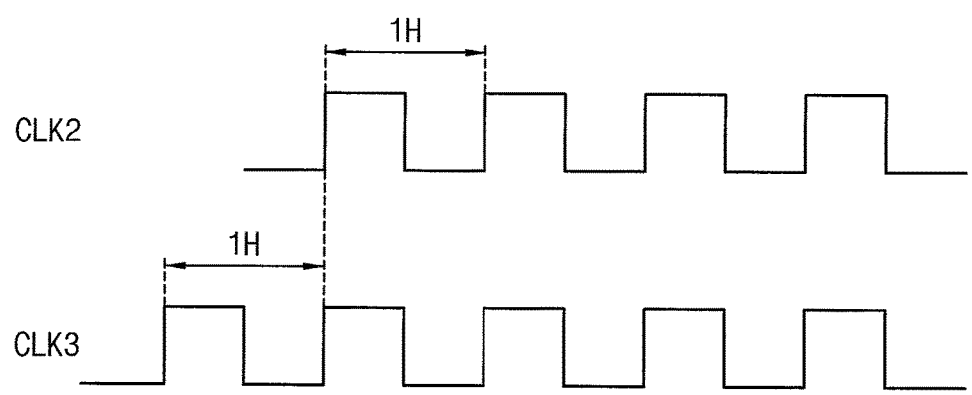
FIG. 2 is a timing diagram illustrating a second clock signal and a third clock signal of FIG. 1.

FIG. 2 is a timing diagram illustrating the second clock signal CLK2 and the third clock signal CLK3 of FIG. 1.

Referring to FIGS. 1 and 2, the third clock signal CLK3 may be ahead of the second clock signal CLK2 by one horizontal time 1H. Here, the horizontal time may refer to a time when the gate line GL is driven.

FIG. 3 is a block diagram illustrating the first data driving IC 300 of FIG. 1.

Referring to FIGS. 1 and 3, the first data driving IC 300 includes a shift register 310, a serial parallel converting part 320, a latch part 330, a digital analog converting part 340 and a buffer part 350.

The shift register 310 receives the horizontal start signal STH, and shifts the horizontal start signal STH to the second data driving IC 400. In addition, the shift resister 310 sequentially provides parallel data PDATA to the latch part 330. Specifically, the shift resister 310 sequentially outputs enable signals En to sequentially store the parallel data PDATA to the latch part 330.

The serial parallel converting part 320 receives the image data DATA, converts the image data DATA to the parallel data PDATA, and outputs the parallel data PDATA. The serial parallel converting part 320 may include a serial parallel converter or a serial parallel converting circuit.

The digital analog converting part 340 converts the parallel data PDATA to analog data ADATA in response to the second clock signal CLK2, and outputs the analog data ADATA to the buffer part 350. The digital analog converting part 340 may include a digital analog converter or a digital analog converting circuit.

The buffer part 350 includes a first buffer 351 and a second buffer 352. The first buffer 351 amplifies the analog data ADATA, and outputs the dummy data signal DDS through the dummy data channel DCH. The first buffer 351 outputs the dummy data signal DDS using the driving voltage DRV. Each of the second buffers 352 amplifies the analog data ADATA, and outputs the data signal DS through the data channel CH. Each of the second buffers 352 outputs the data signal DS using the driving voltage DRV.

Configurations and functions of each of the second data driving ICs 400 is substantially the same as the configuration and the function of the first data driving IC 300 of FIG. 3 except for the first buffer 351 which outputs the dummy data signal DDS through the dummy data channel DCH.

Figure 4A:
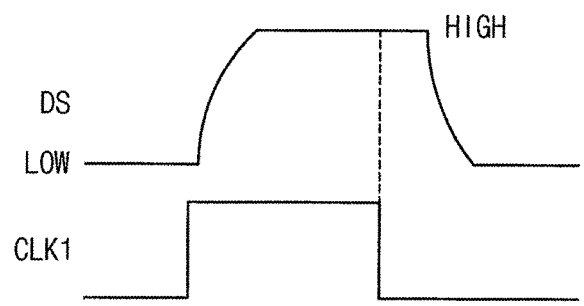
FIG. 4A is waveforms diagram illustrating a first clock signal and a data signal of FIG. 1 when the data signal of FIG. 1 is normal.

FIG. 4A is waveforms diagram illustrating the first clock signal CLK1 and the data signal DS of FIG. 1 when the data signal DS of FIG. 1 is normal.

Referring to FIGS. 1 and 4A, when the data signal DS is normal, the data signal DS starts to increase from a low level at a time adjacent to a rising time of the first clock signal CLK1. In addition, the data signal DS has a high level before a falling time of the first clock signal CLK1. In addition, the data signal DS has a first slew which is a normal slew. Here, the slew may refer to an increasing slope from the low level to the high level of the data signal DS.

Figure 4B:
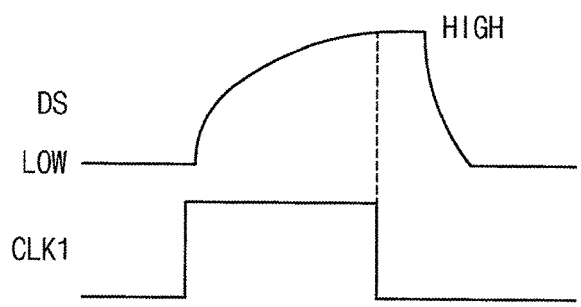
FIG. 4B is waveforms diagram illustrating the first clock signal and the data signal of FIG. 1 when the data signal of FIG. 1 is abnormal.

FIG. 4B is waveforms diagram illustrating the first clock signal CLK1 and the data signal DS of FIG. 1 when the data signal DS of FIG. 1 is abnormal.

Referring to FIGS. 1 and 4B, the data signal DS may be abnormal due to an unintentional decrease. When the data signal DS is abnormal, the data signal DS starts to increase from a low level at a time adjacent to a rising time of the first clock signal CLK1. In addition, the data signal DS does not reach a high level at a falling time of the first clock signal CLK1. In addition, the data signal DS has a second slew which is abnormal. Here, the second slew is less than the first slew. In this case, a charge rate of a pixel voltage which is generated by a charge of the data signal DS to the pixel 120 may decrease.

According to an increase of the number of the data lines DL which are driven by activations of the data signals DS, the driving voltage DRV may decrease, and thus the data signal DS may not reach the high level at the falling time of the first clock signal CLK1. In addition, according to an increase of a difference between a grayscale value of a data signal applied to an (M−1)-th (M is a natural number not less than two) horizontal line and a grayscale value of a data signal applied to an M-th horizontal line, the driving voltage DRV may decrease, and thus the data signal DS may not reach the high level at the falling time of the first clock signal CLK1. Thus, when a multiplication of the number of the data lines DL which are driven by the activations of the data signals DS and a grayscale value change is not less than a reference value, the driving voltage DRV may decrease, and thus the data signal DS may not reach the high level at the falling time of the first clock signal CLK1.

Figure 5:
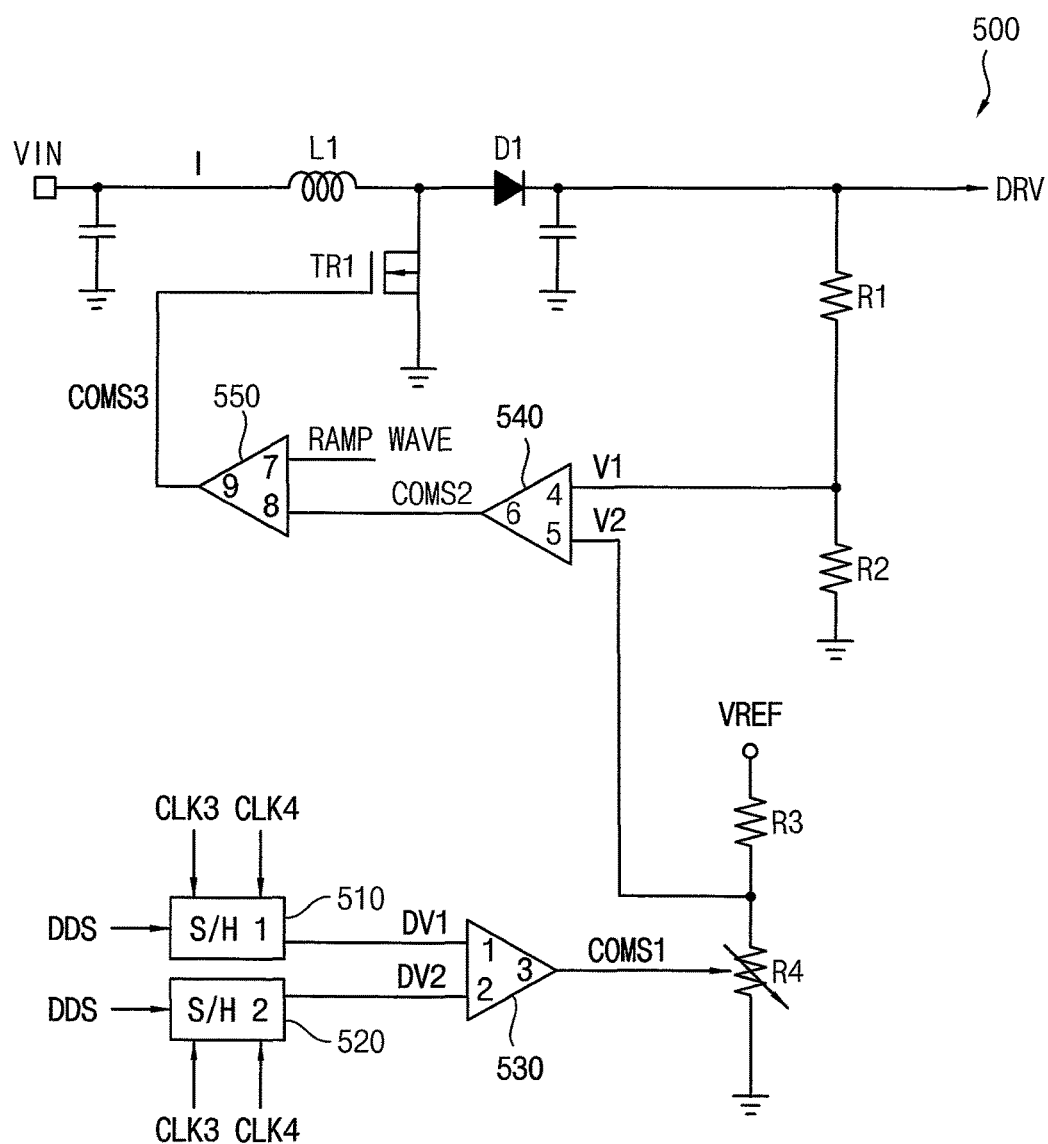
FIG. 5 is a circuit diagram illustrating a voltage providing part of FIG. 1.

FIG. 5 is a circuit diagram illustrating the voltage providing part 500 of FIG. 1.

Referring to FIGS. 1 to 3 and 5, the voltage providing part 500 includes a first sampling holding part 510, a second sampling holding part 520, a first comparing part 530, a second comparing part 540, a third comparing part 550, a first resistor R1, a second resistor R2, a third resistor R3, a fourth resistor R4, an inductor L1, a diode D1 and a transistor TR1.

The first sampling holding part 510 receives the dummy data signal DDS. The first sampling holding part 510 may receive the dummy data signal DDS in response to the third clock signal CLK3. Since the third clock signal CLK3 is ahead of the second clock signal CLK2 by N horizontal time, the first data driving IC 300 may include a line buffer to output the dummy data signal DDS which is output in response to the second clock signal CLK2. The first sampling holding part 510 detects a voltage of the dummy data signal DDS and outputs a first data voltage DV1 in response to the fourth clock signal CLK4. In an exemplary embodiment, the first sampling holding part 510 may include a sampling holding circuit, for example.

The second sampling holding part 520 receives the dummy data signal DDS. The second sampling holding part 520 may receive the dummy data signal DDS in response to the third clock signal CLK3. The second sampling holding part 520 detects the voltage of the dummy data signal DDS and outputs a second data voltage DV2 in response to the fourth clock signal CLK4. In an exemplary embodiment, the second sampling holding part 520 may include a sampling holding circuit, for example.

The first comparing part 530 includes a first terminal 1, a second terminal 2 and a third terminal 3. The first terminal 1 is a first input terminal of the first comparing part 530, the second terminal 2 is a second terminal of the first comparing part 530, and the third terminal 3 is an output terminal of the first comparing part 530. The first terminal 1 receives the first data voltage DV1, the second terminal 2 receives the second data voltage DV2, and the third terminal 3 outputs a first comparison signal COMS1. The first comparing part 530 compares the first data voltage DV1 with the second data voltage DV2, and outputs the first comparison signal COMS1 indicating a difference between the first data voltage DV1 and the second data voltage DV2. In an exemplary embodiment, the first comparing part 530 may include a comparator or an operational amplifier, for example.

The second comparing part 540 includes a fourth terminal 4, a fifth terminal 5 and a sixth terminal 6. The fourth terminal 4 is a first input terminal of the second comparing part 540, the fifth terminal 5 is a second input terminal of the second comparing part 540, and the sixth terminal 6 is an output terminal of the second comparing part 540. The fourth terminal 4 receives a first voltage V1, the fifth terminal 5 receives a second voltage V2, and the sixth terminal 6 outputs a second comparison signal COMS2. The second comparing part 540 compares the first voltage V1 with the second voltage V2, and outputs the second comparison signal COMS2 indicating a difference of the first voltage V1 and the second voltage V2. In an exemplary embodiment, the second comparing part 540 may include a comparator or an operational amplifier, for example.

The first resistor R1 is connected between the second resistor R2 and a terminal through which the driving voltage DRV is output. In addition, the first resistor R1 is connected to the fourth terminal 4 of the second comparing part 540.

The second resistor R2 is connected to the first resistor R1 and a terminal to which a ground voltage is applied. In addition, the second resistor R2 is connected to the fourth terminal 4 of the second comparing part 540.

The first voltage V1 is generated through a division of the driving voltage DRV by the first resistor R1 and the second resistor R2. Specifically, the first voltage V1 may be calculated by [Equation 1].

$$V1 = DRV \cdot R2/(R1+R2) \qquad \text{[Equation 1]}$$

Here, 'V1' denotes the first voltage V1, 'DRV' denotes the driving voltage DRV, 'R1' denotes a resistance of the first resistor R1, and 'R2' denotes a resistance of the second resistor R2.

The third resistor R3 is connected to the fourth resistor R4 and a terminal to which a reference voltage VREF is applied.

In addition, the third resistor R3 is connected to the fifth terminal 5 of the second comparing part 540.

The fourth resistor R4 is connected to the third resistor R3 and the terminal to which the ground voltage is applied. In addition, the fourth resistor R4 is connected to the fifth terminal 5 of the second comparing part 540. The fourth resistor R4 is a variable resistor of which a resistance is changed. In an exemplary embodiment, the fourth resistor R4 may be a digital variable resistor ("DVR"), for example.

The second voltage V2 is generated through a division of the reference voltage VREF by the third resistor R3 and the fourth resistor R4. Specifically, the second voltage V2 may be calculated by [Equation 2].

$$V2 = VREF \cdot R4/(R3+R4) \qquad \text{[Equation 2]}$$

Here, 'V2' denotes the second voltage V2, 'VREF' denotes the reference voltage VREF, 'R3' denotes a resistance of the third resistor R3, and 'R4' denotes the resistance of the fourth resistor R4.

The third comparing part 550 includes a seventh terminal 7, an eighth terminal 8 and a ninth terminal 9. The seventh terminal 7 is a first input terminal of the third comparing part 550, the eighth terminal 8 is a second input terminal of the third comparing part 550, and the ninth terminal 9 is an output terminal of the third comparing part 550. The seventh terminal 7 receives a ramp wave which is a triangular wave, the eighth terminal 8 receives the second comparison signal COMS2, and the ninth terminal 9 outputs a third comparison signal COMS3. The third comparing part 550 compares the second comparison signal COMS2 with the ramp wave, and outputs the third comparison signal COMS3 indicating a difference between the second comparison signal COMS2 and the ramp wave. In an exemplary embodiment, the third comparing part 550 may include a comparator or an operational amplifier, for example.

The transistor TR1 is a switching element. The transistor TR1 turns on or turns off by the third comparison signal COMS3. The transistor TR1 is connected between the inductor L1 and the terminal to which the ground voltage is applied.

The inductor L1 is connected between the diode D1 and a terminal to which the input voltage Vin is applied. In addition, the inductor L1 is connected to the transistor TR1.

The diode D1 is connected between the inductor L1 and a terminal through which the driving voltage DRV is output.

Figure 6:
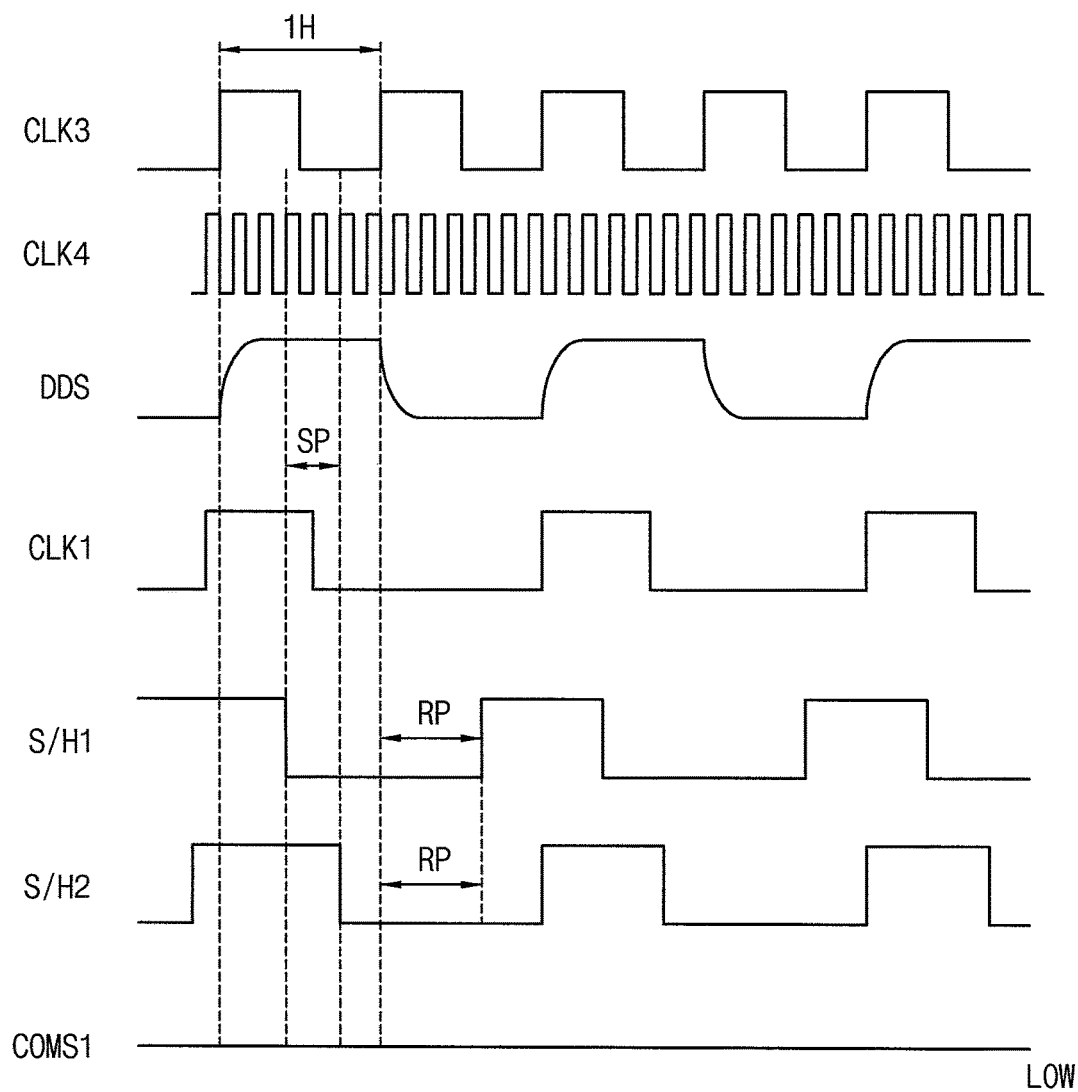
FIG. 6 is a timing diagram illustrating the third clock signal, a fourth clock signal, a dummy data signal and the first clock signal of FIG. 1, a first sampling holding signal generated by a first sampling holding part of FIG. 5, a second sampling holding signal generated by a second sampling holding part of FIG. 5, and a first comparison signal of FIG. 5, when the data signal is normal as shown in FIG. 4A.

FIG. 6 is a timing diagram illustrating the third clock signal CLK3, the fourth clock signal CLK4, the dummy data signal DDS and the first clock signal CLK1 of FIG. 1, a first sampling holding signal S/H1 generated by the first sampling holding part 510 of FIG. 5, a second sampling holding signal S/H2 generated by the second sampling holding part 520 of FIG. 5, and the first comparison signal COMS1 of FIG. 5, when the data signal DS is normal as shown in FIG. 4A.

Referring to FIGS. 1, 4A, 5 and 6, the voltage providing part 500 receives the dummy data signal DDS, and detects the voltage difference of the dummy data signal DDS according to a time. The voltage providing part 500 detects the voltage difference according to the time of the dummy data signal DDS. The voltage providing part 500 may detect the voltage difference of the dummy data signal DDS between levels before and after of the falling time of the first clock signal CLK1. The voltage providing part 500 may detect the voltage difference of the dummy data signal DDS in response to the third clock signal CLK3.

Specifically, the first sampling holding part 510 may detect a level of the dummy data signal DDS at the falling time of the first sampling holding signal S/H1, and may output the first data voltage DV1. The second sampling holding part 520 may detect a level of the dummy data signal DDS at the falling time of the second sampling holding signal S/H2, and may output the second data voltage DV2.

A falling time of the first sampling holding signal S/H1 is before the falling time of the first clock signal CLK1. A falling time of the second sampling holding signal S/H2 is after the falling time of the first clock signal CLK1. Therefore, the falling time of the first clock signal CLK1 is between the falling time of the first sampling holding signal S/H1 and the falling time of the second sampling holding signal S/H2. In an exemplary embodiment, the falling time of the first clock signal CLK1 may correspond to a rising time of a fifth clock of the fourth clock signal CLK4, the first sampling holding signal S/H1 may fall in response to a rising of a fourth clock of the fourth clock signal CLK4, and the second sampling holding signal S/H2 may fall in response to a rising of a sixth clock of the fourth clock signal CLK4, for example. A time between the falling time of the first sampling holding signal S/H1 and the falling time of the second sampling holding signal S/H2 may be referred to as a sampling period SP.

Each of the first sampling holding signal S/H1 and the second sampling holding signal S/H2 may further include a reset period RP. The reset period RP may start at a time when one horizontal time 1H is ended, and may include a period when the first clock signal CLK1 is not activated.

A level change of the dummy data signal DDS is substantially the same as a level change of the data signal DS. Since the data signal DS is normal, the dummy data signal DDS has a high level before the falling time of the first clock signal CLK1.

Therefore, the first data voltage DV1 indicating the level of the dummy data signal DDS at the falling time of the first sampling holding signal S/H1 and the second data voltage DV2 indicating the level of the dummy data signal DDS at the falling time of the second sampling holding signal S/H2 are substantially the same as each other.

Since the first data voltage DV1 and the second data voltage DV2 are substantially the same as each other, the first comparison signal COMS1 output from the first comparing part 530 has a low level.

When the first comparison signal COMS1 is the low level, the resistance of the fourth resistor R4 may not be changed and may be maintained. Thus, the driving voltage DRV may be maintained.

Figure 7:
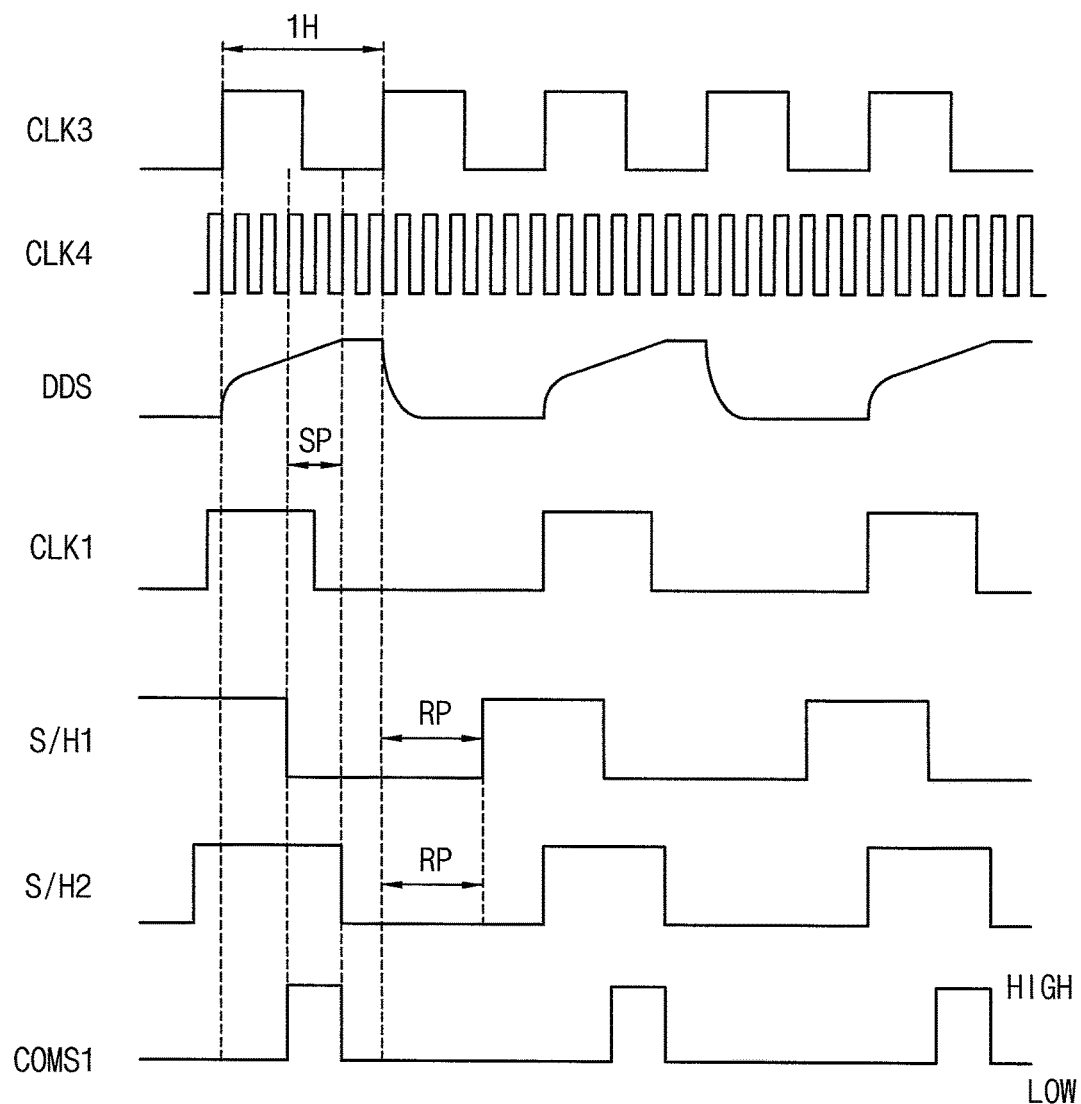
FIG. 7 is a timing diagram illustrating the third clock signal, the fourth clock signal, the dummy data signal and the first clock signal of FIG. 1, the first sampling holding signal generated by the first sampling holding part of FIG. 5, the second sampling holding signal generated by the second sampling holding part of FIG. 5, and the first comparison signal of FIG. 5, when the data signal is abnormal as shown in FIG. 4B.

FIG. 7 is a timing diagram illustrating the third clock signal CLK3, the fourth clock signal CLK4, the dummy data signal DDS and the first clock signal CLK1 of FIG. 1, the first sampling holding signal S/H1 generated by the first sampling holding part 510 of FIG. 5, the second sampling holding signal S/H2 generated by the second sampling holding part 520 of FIG. 5, and the first comparison signal COMS1 of FIG. 5, when the data signal DS is abnormal as shown in FIG. 4B.

Referring to FIGS. 1, 4B, 5 and 7, the voltage providing part 500 receives the dummy data signal DDS, and detects the voltage difference of the dummy data signal DDS according to a time. The voltage providing part 500 may detect the voltage difference of the dummy data signal DDS between before and after of the falling time of the first clock signal CLK1. The voltage providing part 500 may detect the voltage difference of the dummy data signal DDS in response to the third clock signal CLK3.

Specifically, the first sampling holding part 510 may detect the level of the dummy data signal DDS at the falling time of the first sampling holding signal S/H1, and may output the first data voltage DV1. The second sampling holding part 520 may detect the level of the dummy data signal DDS at the falling time of the second sampling holding signal S/H2, and may output the second data voltage DV2.

The falling time of the first sampling holding signal S/H1 is before the falling time of the first clock signal CLK1. The falling time of the second sampling holding signal S/H2 is after the falling time of the first clock signal CLK1. Therefore, the falling time of the first clock signal CLK1 is between the falling time of the first sampling holding signal S/H1 and the falling time of the second sampling holding signal S/H2. In an exemplary embodiment, the falling time of the first clock signal CLK1 may correspond to the rising time of the fifth clock of the fourth clock signal CLK4, the first sampling holding signal S/H1 may fall in response to the rising of the fourth clock of the fourth clock signal CLK4, and the second sampling holding signal S/H2 may fall in response to the rising of the sixth clock of the fourth clock signal CLK4, for example. The time between the falling time of the first sampling holding signal S/H1 and the falling time of the second sampling holding signal S/H2 may be referred to as the sampling period SP.

The level change of the dummy data signal DDS is substantially the same as the level change of the data signal DS. Since the data signal DS is abnormal, the dummy data signal DDS does not reach a high level at the falling time of the first clock signal CLK1.

Therefore, the first data voltage DV1 indicating the level of the dummy data signal DDS at the falling time of the first sampling holding signal S/H1 and the second data voltage DV2 indicating the level of the dummy data signal DDS at the falling time of the second sampling holding signal S/H2 are different from each other. Specifically, the first data voltage DV1 indicating the level of the dummy data signal DDS at the falling time of the first sampling holding signal S/H1 is less than the second data voltage DV2 indicating the level of the dummy data signal DDS at the falling time of the second sampling holding signal S/H2.

Since the first data voltage DV1 is less than the second data voltage DV2, the first comparison signal COMS1 output from the first comparing part 530 has a high level.

When the first comparison signal COMS1 is the high level, the resistance of the fourth resistor R4 may be increased. Thus, the driving voltage DRV may be increased.

Specifically, when the resistance of the fourth resistor R4 increases, the second voltage V2 increases. When the second voltage V2 increases, the second comparison signal COMS2 output from the second comparing part 540 increases compared to a case in which the first voltage V1 and the second voltage V2 are substantially the same as each other.

Figure 8:
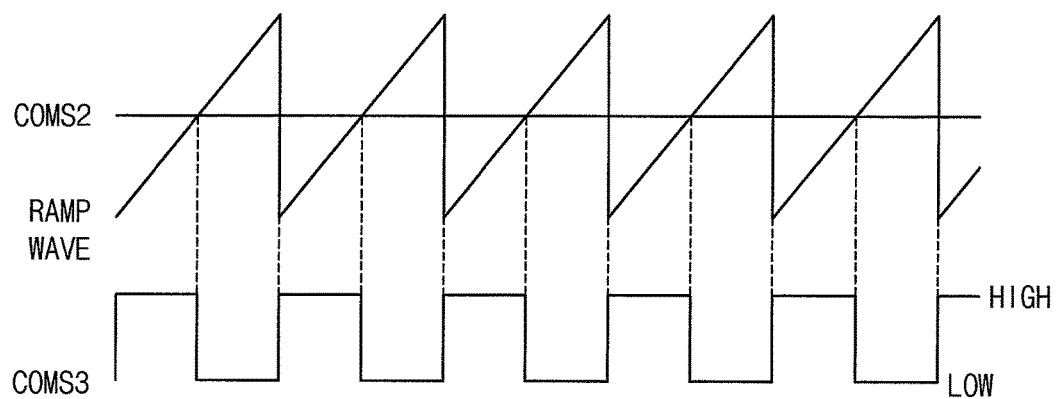
FIG. 8 is a timing diagram illustrating a second comparison signal, a ramp wave applied to a third comparing part and a third comparison signal of FIG. 5, when the data signal is abnormal as shown in FIG. 4B.

FIG. 8 is a timing diagram illustrating the second comparison signal COMS2, the ramp wave applied to the third comparing part 550 and the third comparison signal COMS3 of FIG. 5, when the data signal DS is abnormal as shown in FIG. 4B.

Referring to FIGS. 5, 7 and 8, as shown in FIG. 7, when the first comparison signal COMS1 is the high level, the resistance of the fourth resistor R4 increases. Thus, the driving voltage DRV increases.

Specifically, when the resistance of the fourth resistor R4 increases, the second voltage V2 increases. When the second voltage V2 increases, the second comparison signal COMS2 output from the second comparing part 540 increases compared to the case in which the first voltage V1 and the second voltage V2 are substantially the same as each other. In this case, the second comparison signal COMS2 includes a period when the second comparison signal COMS2 is less than a level of the ramp wave and a period when the second comparison signal COMS2 is greater than the level of the ramp wave. The third comparison signal COMS3 has a high level in the period when the second comparison signal COMS2 is greater than the level of the ramp wave, and has a low level in the period when the second comparison signal COMS2 is less than the level of the ramp wave.

When the transistor TR1 turns on by the third comparison signal COMS3, some of a current I flowing through the inductor L1 flows toward the terminal to which the ground voltage is applied, through the transistor TR1. Therefore, a current flowing toward the terminal through which the driving voltage DRV is output decreases. Since the current flowing toward the terminal through which the driving voltage DRV is output decreases, the driving voltage DRV increases with respect to the same power by the equation of 'power=voltage*current'.

Figure 9:
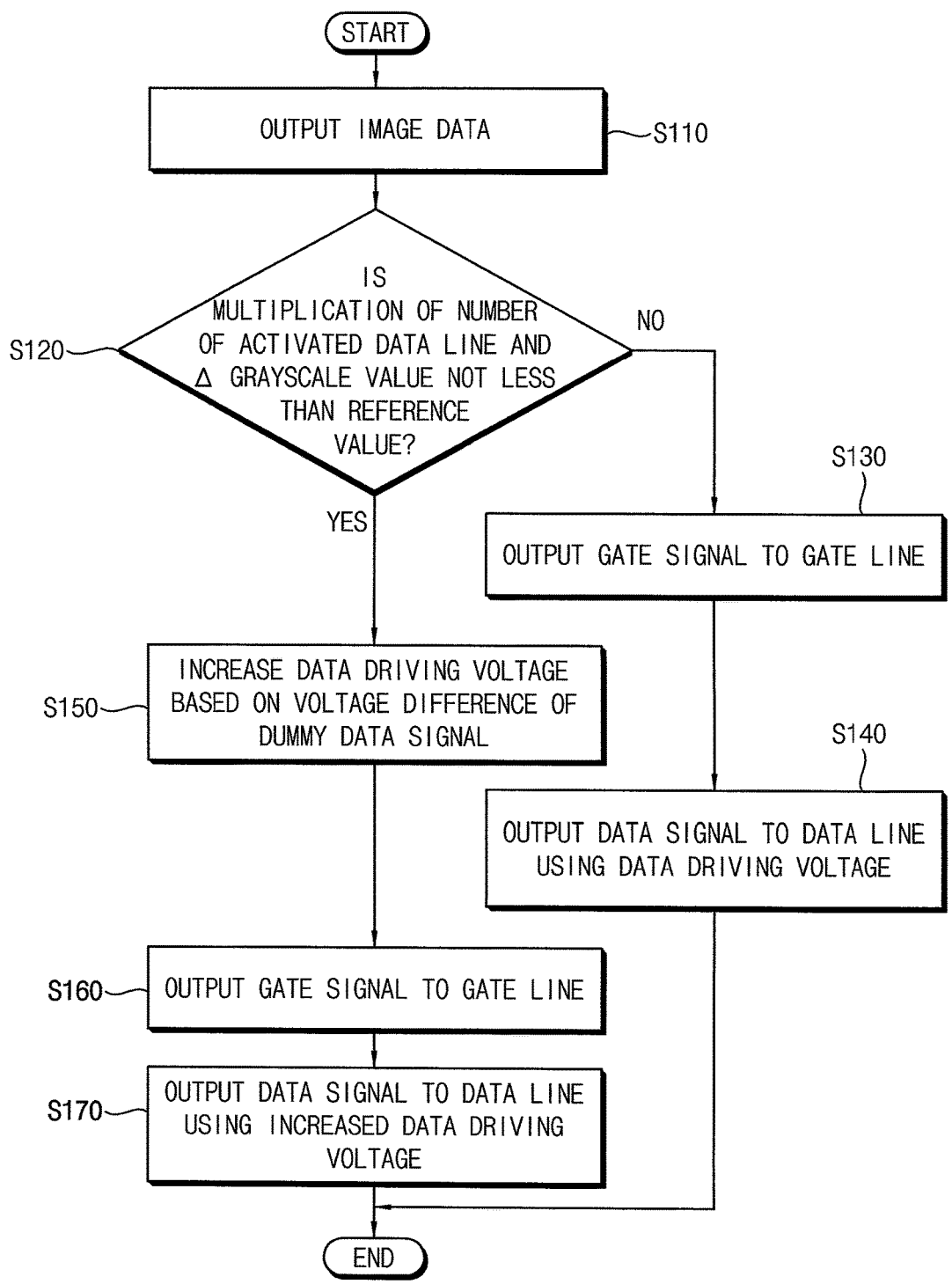
FIG. 9 is a flowchart illustrating a method of driving the display apparatus of FIG. 1.

FIG. 9 is a flowchart illustrating a method of driving the display apparatus 100 of FIG. 1.

Referring to FIGS. 1 to 9, the image data DATA is output (operation S110). Specifically, the timing controlling part 150 receives the input image data IDATA and outputs the image data DATA to the data driving part 200.

It is determined whether a multiplication of the number of the data lines DL which are activated and a Δ grayscale value is not less than the reference value (operation 5120). Specifically, it is determined whether the multiplication of the number of the data lines DL which are activated by the activations of the data signals DS and the grayscale value change of the data signals DS is not less than the reference value.

When the multiplication of the number of the data lines DL which are activated and the Δ grayscale value is less than the reference value, it is determined that the data signal DS is normal. In this case, the display apparatus is normally driven.

Thus, the gate signal GS is output to the gate line GL (operation S130). The gate driving part 130 generates the gate signals GS in response to the vertical start signal STV and the first clock signal CLK1 provided from the timing controlling part 150, and outputs the gate signals GS to the gate lines GL, respectively.

In addition, the data signal DS is output to the data line DL using the data driving voltage DRV (operation S140). Specifically, the data driving part 200 receives the image data DATA from the timing controlling part 150, generates the data signal DS using the image data DATA, and outputs the data signal DS to the data line DL in response to the horizontal start signal STH and the second clock signal CLK2 provided from the timing controlling part 150.

When the multiplication of the number of the data lines DL which are activated and the Δ grayscale value is not less than the reference value, it is determined that the data signal DS is abnormal.

In this case, the data driving voltage DRV increases based on the voltage difference of the dummy data signal DDS (operation S150).

Specifically, the voltage providing part 500 receives the dummy data signal DDS, and detects the voltage difference of the dummy data signal DDS according to a time. The voltage providing part 500 detects the voltage difference according to the time of the dummy data signal DDS. The voltage providing part 500 may detect the voltage difference of the dummy data signal DDS between levels before and after of the falling time of the first clock signal CLK1. The voltage providing part 500 may detect the voltage difference of the dummy data signal DDS in response to the third clock signal CLK3.

Specifically, the first sampling holding part 510 may detect the level of the dummy data signal DDS at the falling time of the first sampling holding signal S/H1, and may output the first data voltage DV1. The second sampling holding part 520 may detect the level of the dummy data signal DDS at the falling time of the second sampling holding signal S/H2, and may output the second data voltage DV2.

The falling time of the first sampling holding signal S/H1 is before the falling time of the first clock signal CLK1. The falling time of the second sampling holding signal S/H2 is after the falling time of the first clock signal CLK1. Therefore, the falling time of the first clock signal CLK1 is between the falling time of the first sampling holding signal S/H1 and the falling time of the second sampling holding signal S/H2. In an exemplary embodiment, the falling time of the first clock signal CLK1 may correspond to the rising time of the fifth clock of the fourth clock signal CLK4, the first sampling holding signal S/H1 may fall in response to the rising of the fourth clock of the fourth clock signal CLK4, and the second sampling holding signal S/H2 may fall in response to the rising of the sixth clock of the fourth clock signal CLK4, for example.

The level change of the dummy data signal DDS is substantially the same as the level change of the data signal DS. Since the data signal DS is abnormal, the dummy data signal DDS does not reach a high level at the falling time of the first clock signal CLK1.

Therefore, the first data voltage DV1 indicating the level of the dummy data signal DDS at the falling time of the first sampling holding signal S/H1 and the second data voltage DV2 indicating the level of the dummy data signal DDS at the falling time of the second sampling holding signal S/H2 are different from each other. Specifically, the first data voltage DV1 indicating the level of the dummy data signal DDS at the falling time of the first sampling holding signal S/H1 is less than the second data voltage DV2 indicating the level of the dummy data signal DDS at the falling time of the second sampling holding signal S/H2.

Since the first data voltage DV1 is less than the second data voltage DV2, the first comparison signal COMS1 output from the first comparing part 530 has a high level.

When the first comparison signal COMS1 is the high level, the resistance of the fourth resistor R4 increases. Thus, the driving voltage DRV increases.

Specifically, when the resistance of the fourth resistor R4 increases, the second voltage V2 increases. When the second voltage V2 increases, the second comparison signal COMS2 output from the second comparing part 540 increases compared to the case in which the first voltage V1 and the second voltage V2 are substantially the same as each other. In this case, the second comparison signal COMS2 includes the period when the second comparison signal COMS2 is less than the level of the ramp wave and the period when the second comparison signal COMS2 is greater than the level of the ramp wave. The third comparison signal COMS3 has a high level in the period when the second comparison signal COMS2 is greater than the level of the ramp wave, and has a low level in the period when the second comparison signal COMS2 is less than the level of the ramp wave.

When the transistor TR1 turns on by the third comparison signal COMS3, some of the current I flowing through the inductor L1 flows toward the terminal to which the ground voltage is applied, through the transistor TR1. Therefore, the current flowing toward the terminal through which the driving voltage DRV is output decreases. Since the current flowing toward the terminal through which the driving voltage DRV is output decreases, the driving voltage DRV increases with respect to the same power by the equation of 'power=voltage*current'.

The gate signal GS is output to the gate line GL (operation S160). Specifically, the gate driving part 130 generates the gate signals GS in response to the vertical start signal STV and the first clock signal CLK1 provided from the timing controlling part 150, and outputs the gate signals GS to the gate lines GL, respectively.

The data signal DS is output to the data line DL using the increased data driving voltage DRV (operation S170). Specifically, the data driving part 200 receives the image data DATA from the timing controlling part 150, generates the data signal DS using the image data DATA, and outputs the data signal DS to the data line DL in response to the horizontal start signal STH and the second clock signal CLK2 provided from the timing controlling part 150.

According to the illustrated exemplary embodiment, since the driving voltage DRV is increased by detecting the decrease of the dummy data signal DDS according to the decrease of the driving voltage DRV, the decrease of the data signal DS may be prevented. Therefore, a charge rate of a pixel voltage which is generated by a charge of the data signal DS to the pixel 120 may increase. Thus, display quality of the display apparatus 100 may be improved.

Figure 10:
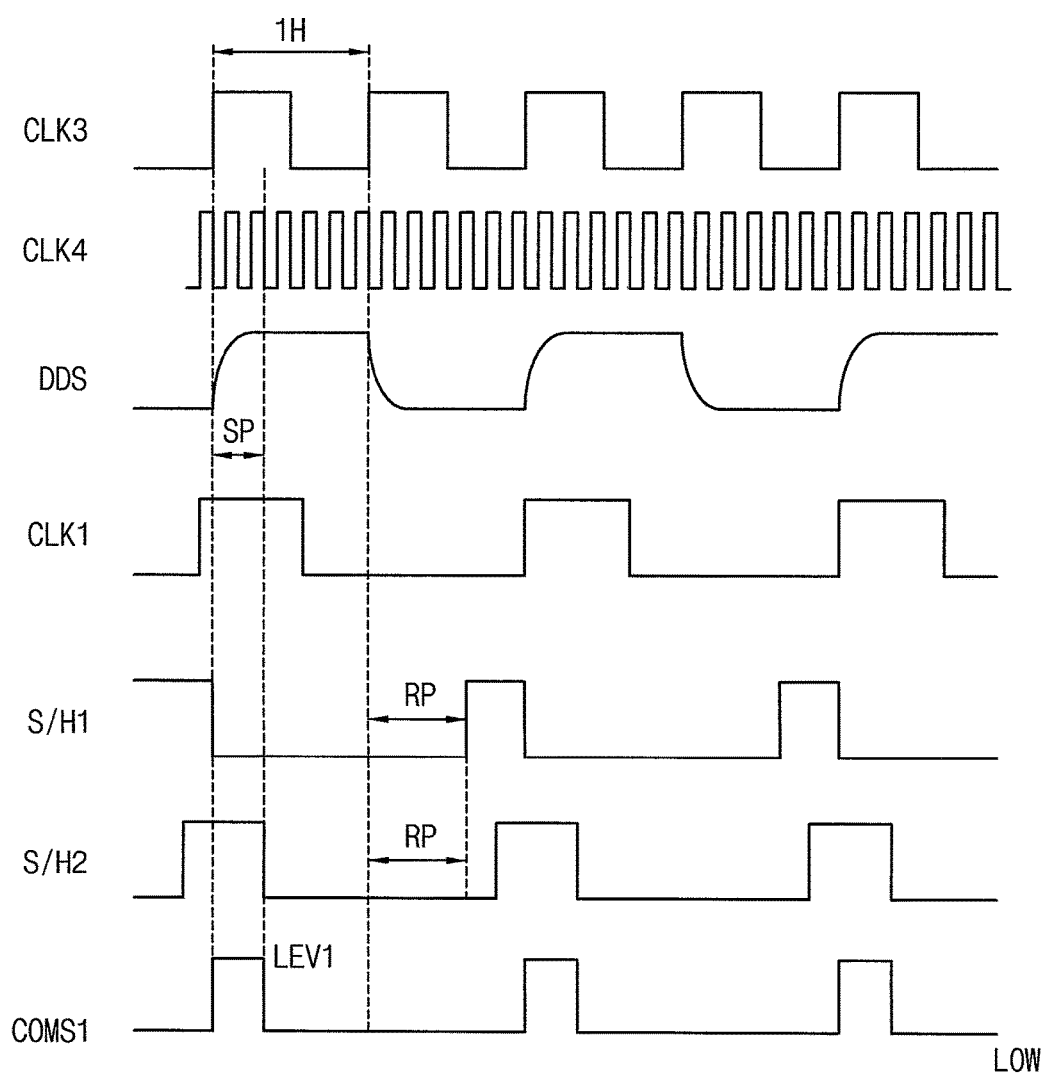
FIG. 10 is a timing diagram illustrating the third clock signal, the fourth clock signal, the dummy data signal and the first clock signal of FIG. 1, the first sampling holding signal generated by the first sampling holding part of FIG. 5, the second sampling holding signal generated by the second sampling holding part of FIG. 5, and the first comparison signal of FIG. 5, when the data signal is normal as shown in FIG. 4A, according to an exemplary embodiment of the invention.

FIG. 10 is a timing diagram illustrating the third clock signal CLK3, the fourth clock signal CLK4, the dummy data signal DDS and the first clock signal CLK1 of FIG. 1, the first sampling holding signal S/H1 generated by the first sampling holding part 510 of FIG. 5, the second sampling holding signal S/H2 generated by the second sampling holding part 520 of FIG. 5, and the first comparison signal COMS1 of FIG. 5, when the data signal DS is normal as shown in FIG. 4A, according to an exemplary embodiment of the invention.

Referring to FIGS. 1, 4A, 5 and 10, the voltage providing part 500 receives the dummy data signal DDS, and detects the voltage difference of the dummy data signal DDS according to a time. The voltage providing part 500 detects the voltage difference according to the time of the dummy data signal DDS. The voltage providing part 500 may detect the voltage difference of the dummy data signal DDS in a period when the dummy data signal DDS increases. The voltage providing part 500 may detect the voltage difference of the dummy data signal DDS in response to the third clock signal CLK3.

Specifically, the first sampling holding part 510 may detect the level of the dummy data signal DDS at the falling time of the first sampling holding signal S/H1, and may output the first data voltage DV1. The second sampling holding part 520 may detect the level of the dummy data signal DDS at the falling time of the second sampling holding signal S/H2, and may output the second data voltage DV2.

The falling time of the first sampling holding signal S/H1 is a time when the dummy data signal DDS starts to increase from a low level. The falling time of the second sampling holding signal S/H2 is a time when the dummy data signal DDS increases to a high level. In an exemplary embodiment, the first sampling holding signal S/H1 may fall in response to a falling of a first clock of the fourth clock signal CLK4, and the second sampling holding signal S/H2 may fall in response to a rising of a third clock of the fourth clock signal CLK4, for example. A time between the falling time of the first sampling holding signal S/H1 and the falling time of the second sampling holding signal S/H2 may be referred to as a sampling period SP.

The level change of the dummy data signal DDS is substantially the same as the level change of the data signal DS. Since the data signal DS is normal, the first data signal DS has the first slew which is normal, and the dummy data signal DDS also has the first slew.

Therefore, the first data voltage DV1 indicating the level of the dummy data signal DDS at the falling time of the first sampling holding signal S/H1 may correspond to the low level of the dummy data signal DDS, and the second data voltage DV2 indicating the level of the dummy data signal DDS at the falling time of the second sampling holding signal S/H2 may correspond to the high level of the dummy data signal DDS.

Thus, the first comparison signal COMS1 output from the first comparing part 530 has a first level LEV1 corresponding to a difference between the high level and the low level of the dummy data signal DDS.

When the first comparison signal COMS1 is the low level, the resistance of the fourth resistor R4 may not be changed and may be maintained. Thus, the driving voltage DRV may be maintained.

Figure 11:
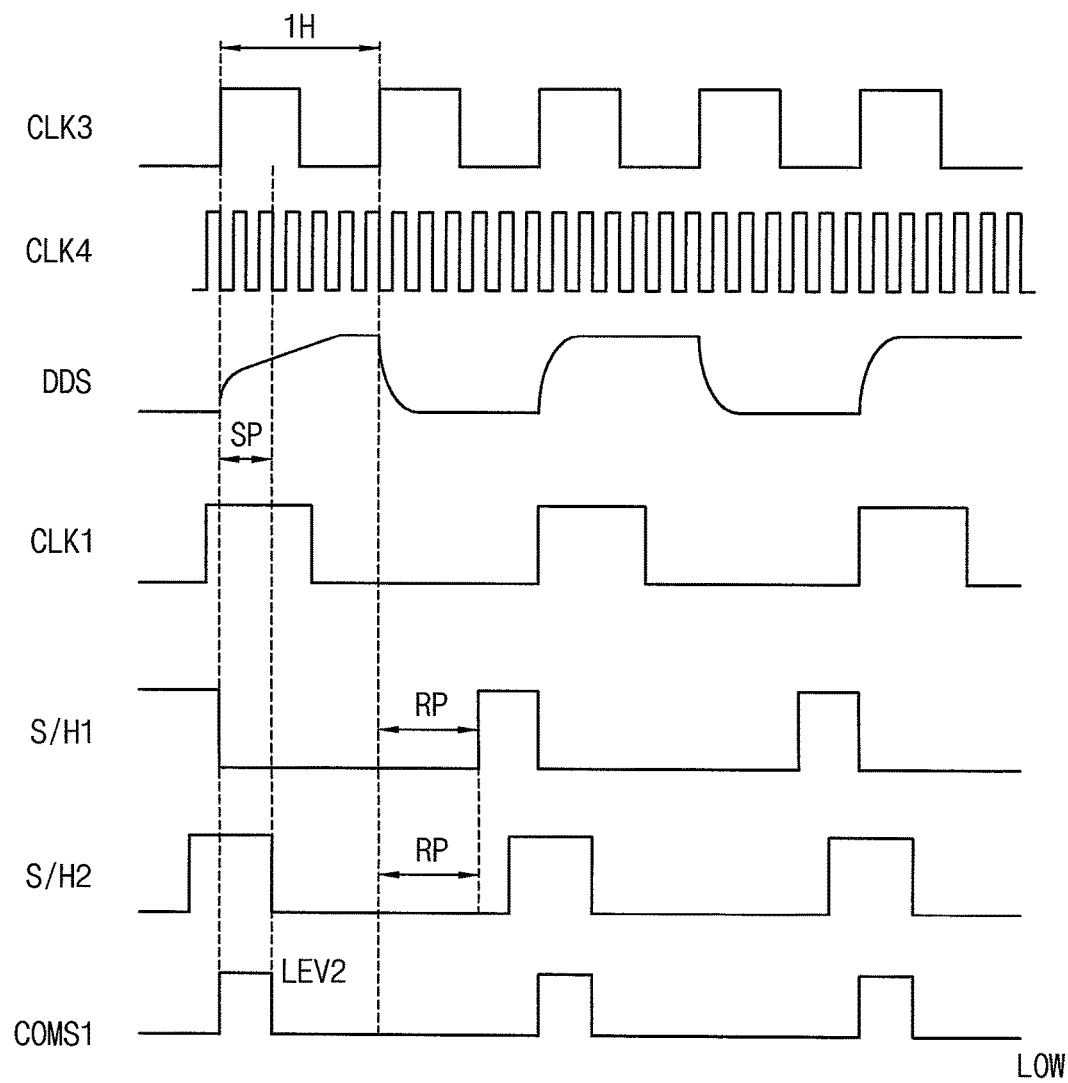
FIG. 11 is a timing diagram illustrating an exemplary embodiment of the third clock signal, the fourth clock signal, the dummy data signal and the first clock signal of FIG. 1, the first sampling holding signal generated by the first sampling holding part of FIG. 5, the second sampling holding signal generated by the second sampling holding part of FIG. 5, and the first comparison signal of FIG. 5, when the data signal is abnormal as shown in FIG. 4B, according to the invention.

FIG. 11 is a timing diagram illustrating the third clock signal CLK3, the fourth clock signal CLK4, the dummy data signal DDS and the first clock signal CLK1 of FIG. 1, the first sampling holding signal S/H1 generated by the first sampling holding part 510 of FIG. 5, the second sampling holding signal S/H2 generated by the second sampling holding part 520 of FIG. 5, and the first comparison signal COMS1 of FIG. 5, when the data signal DS is abnormal as shown in FIG. 4B, according to an exemplary embodiment of the invention.

Referring to FIGS. 1, 4A, 5 and 11, the voltage providing part 500 receives the dummy data signal DDS, and detects the voltage difference of the dummy data signal DDS according to a time. The voltage providing part 500 may detect the voltage difference of the dummy data signal DDS in the period when the dummy data signal DDS increases. The voltage providing part 500 may detect the voltage difference of the dummy data signal DDS in response to the third clock signal CLK3.

Specifically, the first sampling holding part 510 may detect the level of the dummy data signal DDS at the falling time of the first sampling holding signal S/H1, and may output the first data voltage DV1. The second sampling holding part 520 may detect the level of the dummy data signal DDS at the falling time of the second sampling holding signal S/H2, and may output the second data voltage DV2.

The falling time of the first sampling holding signal S/H1 is the time when the dummy data signal DDS starts to increase from the low level. The falling time of the second sampling holding signal S/H2 is the time before the dummy data signal DDS increases to the high level. In an exemplary embodiment, the first sampling holding signal S/H1 may fall in response to the falling of the first clock of the fourth clock signal CLK4, and the second sampling holding signal S/H2 may fall in response to the rising of the third clock of the fourth clock signal CLK4, for example. The time between the falling time of the first sampling holding signal S/H1 and the falling time of the second sampling holding signal S/H2 may be referred to as the sampling period SP.

The level change of the dummy data signal DDS is substantially the same as the level change of the data signal DS. Since the data signal DS is abnormal, the first data signal DS has the second slew which is abnormal, and the dummy data signal DDS also has the second slew.

Therefore, the first data voltage DV1 indicating the level of the dummy data signal DDS at the falling time of the first sampling holding signal S/H1 may correspond to the low level of the dummy data signal DDS, and the second data voltage DV2 indicating the level of the dummy data signal DDS at the falling time of the second sampling holding signal S/H2 may correspond to a level less than the high level of the dummy data signal DDS.

Thus, the first comparison signal COMS1 output from the first comparing part 530 has a second level LEV2 corresponding to a level less than the difference between the high level and the low level of the dummy data signal DDS.

When the first comparison signal COMS1 is the second level LEV2, the resistance of the fourth resistor R4 may increase. Thus, the driving voltage DRV may increase.

According to the illustrated exemplary embodiment, since the driving voltage DRV is increased by detecting the decrease of the dummy data signal DDS according to the decrease of the driving voltage DRV, the decrease of the data signal DS may be prevented. Therefore, a charge rate of a pixel voltage which is generated by a charge of the data signal DS to the pixel 120 may increase. Thus, display quality of the display apparatus 100 may be improved.

The invention may be applied to an electronic device having a display apparatus. In an exemplary embodiment, the invention may be applied to various electronic devices such as a television, a computer monitor, a laptop, a digital camera, a cellular phone, a smart phone, a tablet personal computer ("PC"), a smart pad, a personal digital assistant ("PDA"), a portable multimedia player ("PMP"), an MP3 player, a navigation system, a camcorder, a portable game console, etc.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
    a display panel which displays an image, and comprises gate lines and data lines;
    a gate driver which outputs gate signals to the gate lines;
    a data driver which outputs data signals to the data lines through data channels, and outputs a dummy data signal through a dummy data channel adjacent to a side of the display panel; and
    a voltage provider which provides a driving voltage to the data driver, receives the dummy data signal, and controls the driving voltage provided to the data driver based on a voltage difference of the dummy data signal according to a time period of the dummy data signal output,
    wherein the voltage providing part maintains or increases the driving voltage based on the voltage difference of the dummy data signal.

2. The display apparatus of claim 1, wherein the voltage provider controls the driving voltage based on a number of the data lines which are driven by activations of the data signals.

3. The display apparatus of claim 2, wherein the voltage provider controls the driving voltage based on a grayscale value change of the data signals.

4. The display apparatus of claim 3, wherein the driving voltage is increased when a multiplication of the grayscale value change of the data signals and the number of the data lines which are driven by the activations of the data signals is not less than a reference value.

5. The display apparatus of claim 4, wherein the driving voltage is maintained when the multiplication of the grayscale value change of the data signals and the number of the data lines which are driven by the activations of the data signals is less than the reference value.

6. The display apparatus of claim 1, wherein the voltage provider controls the driving voltage based on the voltage difference of the dummy data signal before and after of a falling time of a first clock signal which is applied to the gate driver to output the gate signal to the gate line.

7. The display apparatus of claim 6, wherein the voltage provider comprises:
    a first sampling holding part which detects a level of the data signal before the falling time of the first clock signal, and outputs a first data voltage; and
    a second sampling holding part which detects a level of the data signal after the falling time of the first clock signal, and outputs a second data voltage.

8. The display apparatus of claim 7, wherein the voltage provider further comprises a first comparing part which compares the first data voltage of the data signal with the second data voltage of the data signal, and outputs a first comparison signal indicating the voltage difference of the dummy data signal.

9. The display apparatus of claim 8, wherein the voltage provider further comprises a variable resistor of which a resistance increases when the first data voltage and the second data voltage are different from each other.

10. The display apparatus of claim 9, wherein, when the first data voltage and the second data voltage are the same as each other, the resistance of the variable resistor is maintained.

11. The display apparatus of claim 9, wherein the variable resistor is a digital variable resistor.

12. The display apparatus of claim 9, wherein the voltage provider further comprises:
    a first resistor connected to a terminal to which the driving voltage is applied;
    a second resistor connected between the first resistor and a terminal to which a ground voltage is applied;
    a third resistor connected to the variable resistor and a terminal to which a reference voltage is applied; and
    a second comparing part which compares a first voltage which is generated from a division of the driving voltage by the first resistor and the second resistor with a second voltage which is generated from a division of the reference voltage by the third resistor and the variable resistor, and outputs a second comparison signal.

13. The display apparatus of claim 12, wherein the second voltage increases and a level of the second comparison signal increases according to an increase of the resistance of the variable resistor.

14. The display apparatus of claim 13, wherein the voltage provider further comprises a third comparing part which compares the second comparison signal with a triangular wave, and outputs a third comparison signal.

15. The display apparatus of claim 14, wherein the voltage provider comprises:
   an inductor connected to a terminal to which an input voltage for forming the driving voltage is input; and
   a switching element connected to the inductor and the terminal to which the ground voltage is applied.

16. The display apparatus of claim 1, wherein the voltage provider controls the driving voltage based on the voltage difference of the dummy data signal in a period when the dummy data signal increases.

17. The display apparatus of claim 1, wherein the voltage provider detects the voltage difference of the dummy data signal in response to a third clock signal ahead of a second clock signal by N (N is a natural number) horizontal time, which is applied to the data driver in order to output the data signal to the data line.

18. A method of driving a display apparatus, the method comprising:
   increasing a data driving voltage applied to a data driver which outputs data signals to data lines, based on a voltage difference of a dummy data signal according to a time period of the dummy data signal output through a dummy data channel adjacent to a side of a display panel displaying an image and comprising a gate line and the data lines;
   outputting a gate signal to the gate line; and
   outputting the data signals to the data lines using the increased data driving voltage,
   wherein the data driving voltage is maintained or increased based on the voltage difference of the dummy data signal.

19. The method of claim 18, further comprising:
   determining wherein a multiplication of a grayscale value change of the data signals and a number of the data lines which are driven by activations of the data signals is not less than a reference value.

20. The method of claim 18, wherein the increasing the data driving voltage based on the voltage difference of the dummy data signal comprises detecting the voltage difference of the dummy data signal before and after of a falling time of a first clock signal which is applied to the gate driver to output the gate signal to the gate line.

* * * * *